United States Patent [19]

Ney et al.

[11] Patent Number: 5,056,857

[45] Date of Patent: Oct. 15, 1991

[54] PICKUP TRUCK RIGID RETRACTABLE ROOF PANEL

[75] Inventors: Clyde W. Ney, Waterford, Mich.; Genaro Prats, Mission Viejo, Calif.

[73] Assignee: Chrysler Corporation, Highland Park, Mich.

[21] Appl. No.: 627,685

[22] Filed: Dec. 14, 1990

[51] Int. Cl.⁵ .................................................. B60J 7/16
[52] U.S. Cl. .................................. 296/107; 296/216; 296/223
[58] Field of Search .................. 296/216, 107, 223

[56] References Cited

U.S. PATENT DOCUMENTS

| | | | |
|---|---|---|---|
| 4,750,778 | 6/1988 | Hoban | 296/107 |
| 4,805,956 | 2/1989 | Saunders | 296/107 |
| 4,950,022 | 8/1990 | Pattee | 296/107 |

*Primary Examiner*—Robert R. Song
*Attorney, Agent, or Firm*—Mark P. Calcaterra

[57] ABSTRACT

A pickup truck has a retractable roof panel moving from a substantially horizontal use position to a substantially vertical storage position behind the passenger seat within the cab. The roof panel is automatically moved along a track from its horizontal to vertical position.

17 Claims, 5 Drawing Sheets

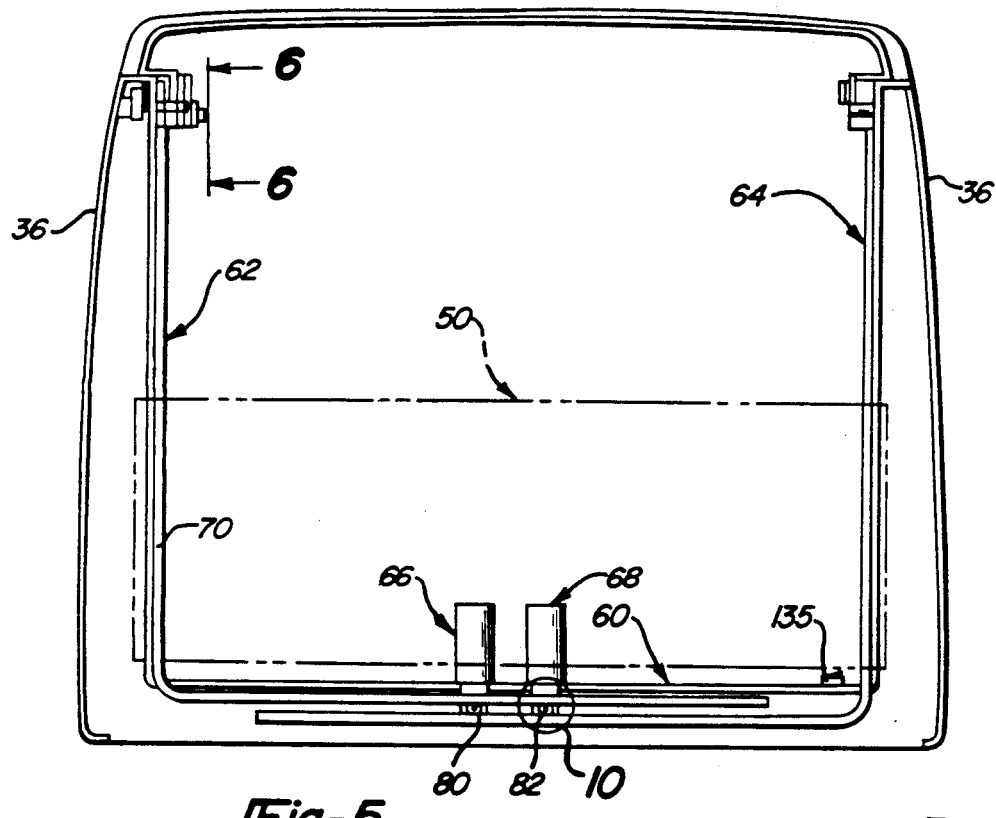
_Fig-5_
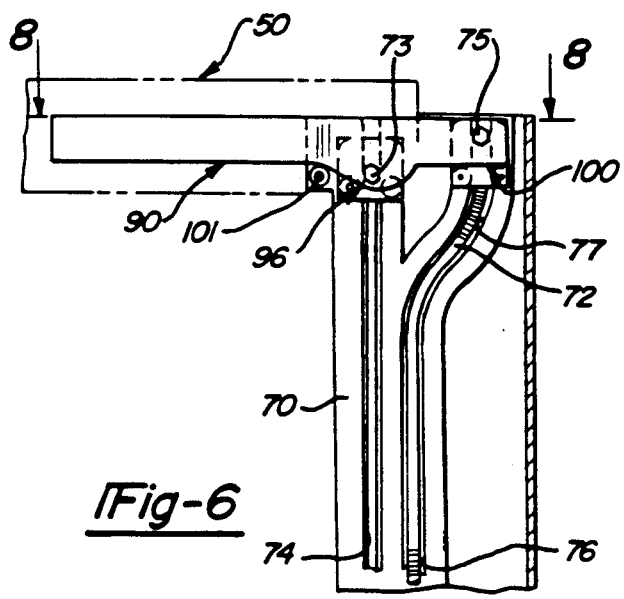
_Fig-6_
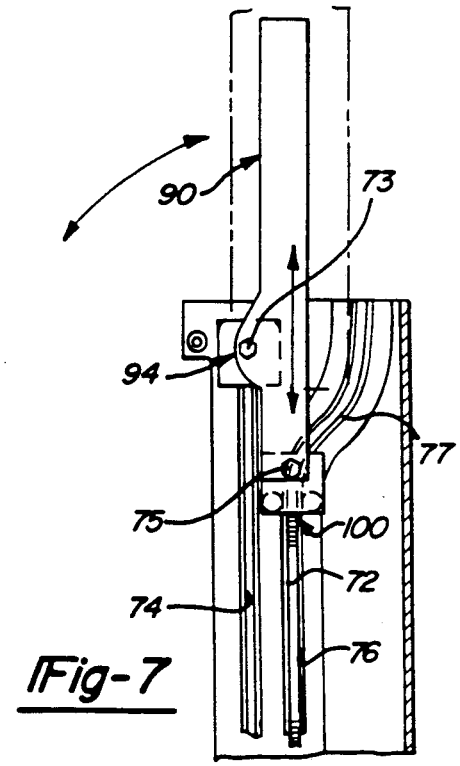
_Fig-7_

PICKUP TRUCK RIGID RETRACTABLE ROOF PANEL

BACKGROUND AND SUMMARY OF THE INVENTION

The present invention relates to motor vehicle bodies and, more particularly, to a rigid retractable roof panel for a pickup truck.

Convertible tops, one piece removable or targa/tops, two piece removable or "T" tops and removable and non-removable sunroofs or moonroofs are common devices which enable vehicle drivers to experience the open air while driving. Many of the above devices are moved or removed either manually or automatically or a combination of the two between a use and storage position. The manual devices require the driver to either fold, crank, push, take off, remove, or the like the device to move or remove it from its roof covering position to its retracted/storage or removed position. The automatic devices are usually operated by a push of a button to move the device from its roof covering position to its retracted storage position.

In pickup trucks, it is desirable to have a removable roof panel. However, due to the design and construction of pickup truck cabs, with their space limitations, it is difficult to design a retractable type of roof for the cabs. Since the pickup truck cab does not have the luxury of having a lengthy longitudinal roof panel, horizontally retractable roof panels are not feasible. Likewise, since pickup trucks do not include a covered trunk or the like, it is difficult to design a convertible top which folds and is stored behind the passenger compartment within the cab.

Retractable roofs for pickup trucks are illustrated by U.S. Pat. Nos. 4,750,778, issued June 14, 1988 to Hoban, entitled "Pickup Truck Convertible Hard Top/Jump Seat"; and 4,805,956, issued Feb. 21, 1989 to Saunders, entitled "Convertible Pickup Truck". Both of these patents illustrate pickup truck roofs where the roofs and back window portions of the cab are manually pivoted together into the bed of the pickup truck. In the '778, the pivoted roof and back window are utilized as a jump seat for the occupant.

While the above described patents enable the pickup driver to experience the open air, the driver is faced with the dilemma of only being able to use a portion of his valuable cargo area in the pickup truck bed while the roof is down. Thus, if the pickup truck driver desires to have a full cargo bed, he would be unable to utilize the retractable roofs illustrated in the above patents.

The present invention provides the art with a rigid retractable roof which moves from a use or horizontal position covering the cab to a vertical storage position within the cab. The retractable roof is automatically retracted by the driver by pushing a switch within the cab. The retractable roof is stored behind the pickup truck's seat, enabling the truck cargo bed to be fully utilized.

From the subsequent detailed description and appended claims taken in conjunction with the accompanying drawings, other objects and advantages of the present invention will become apparent to those skilled in the art.

BRIEF DESCRIPTION OF THE DRAWINGS

FIG. 5 is a section view illustrating the retractable roof track, the section being taken along Line 5—5 of FIG. 2. FIG. 6 is an elevation view of the track of FIG. 5, taken along the Line 6—6 thereof.

FIG. 7 is an elevation view like that of FIG. 6, with the roof panel partially retracted.

DETAILED DESCRIPTION OF THE PREFERRED EMBODIMENT

Figure 1:
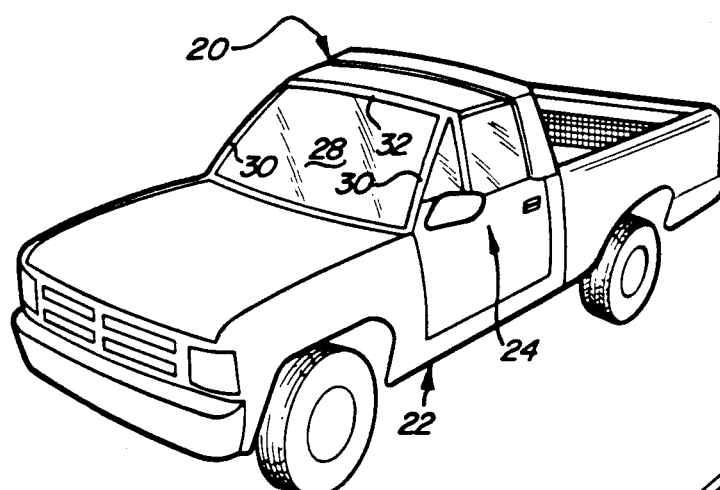
FIG. 1 is a perspective view of a pickup truck including a retractable roof in accordance with the present invention.

Turning to FIGS. 1-4, a pickup truck is illustrated with a rigid retractable roof assembly which is designated with the reference numeral 20. The pickup truck 22 includes a cab 24 having an inside passenger compartment 26. The front of the passenger compartment 26 is defined by the windshield 28 which is surrounded on three sides by a pair of "A" pillars 30 and a cross-pillar 32. The top of the passenger compartment is defined by the roof assembly 20. The rear panel and window 34 define the rear of the passenger compartment while the "B" pillars 36 and doors 38 define the sides of the passenger compartment.

Figure 2:
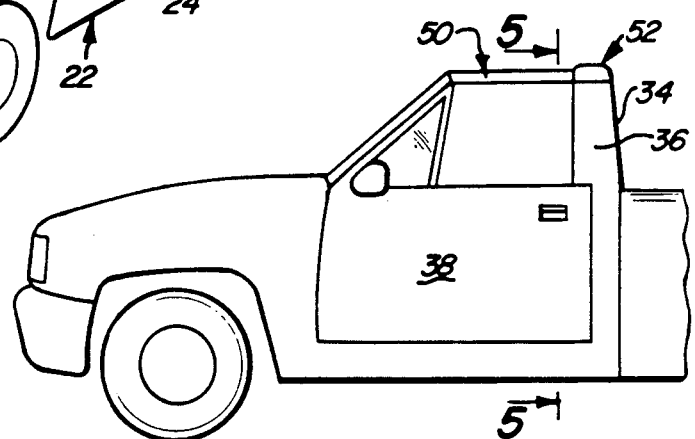
FIG. 2 is a side elevation view of the pickup truck of FIG. 1.
Figure 3:
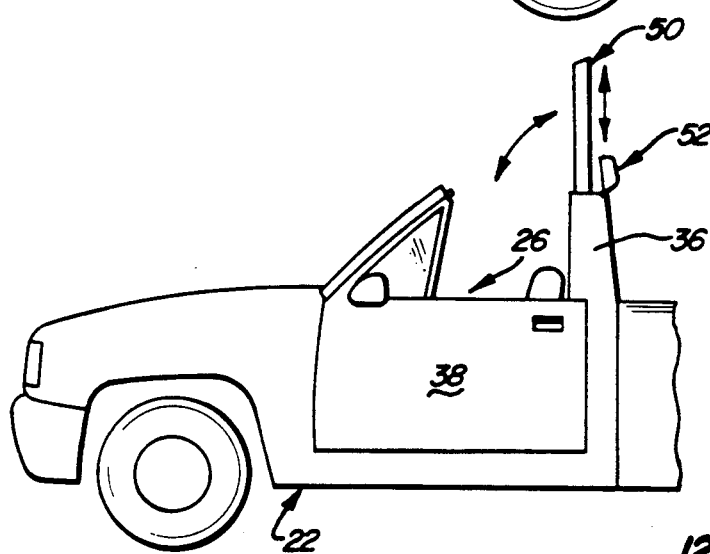
FIG. 3 is a side elevation view similar to that of FIG. 2, illustrating the retractable roof during retraction.

The retractable roof assembly 20 includes a rigid roof panel 50 and a pivotable cover panel 52. The roof panel 50 spans the width of the cab and moves from a first use or horizontal position, as seen in FIGS. 1 and 2, to a substantially vertical storage position in a pocket behind the vehicle seat, as seen in phantom in FIG. 4. The cover panel 52 spans the width of the cab and moves from a horizontal position, as seen in FIGS. 1 and 2, to a raised position, as seen in FIG. 3, to enable the roof panel 50 to pass into the passenger compartment 26 to its storage position as seen in phantom in FIG. 4.

The roof panel 50 is moved from its first horizontal use position to its second storage position by a track assembly 60, illustrated in FIGS. 5 through 10. The track assembly 60 includes track members 62 and 64 with cables driven by one or more motors 66 and 68. The track members 62 and 64 are positioned on opposite sides of the cab, adjacent the "B" pillars 36. The track members 62 and 64 are elongated and generally "L" shaped, vertically extending from the roof towards the floor, then horizontally along the floor, as seen in FIG. 5. In the storage position, the cables are housed in horizontal portions of the track members 62 and 64.

The track members 62 and 64 include a housing 70 and cable 72. The housing 70 includes a follower channel 74 and a cable channel 76. The channels 74 and 76 run vertically from the cab floor towards the roof and are substantially parallel with one another. Near the roof, channel 76 "Y"s away from channel 74 with an arcuate jog 77. The arcuate jog 77 is positioned such that it is along the radius between pivots 73 and 75, as illustrated in FIGS. 6 and 7. Thus, pivot 75 moves along a chord to move to an over center position securing the roof panel 50 in its position.

Figure 10:
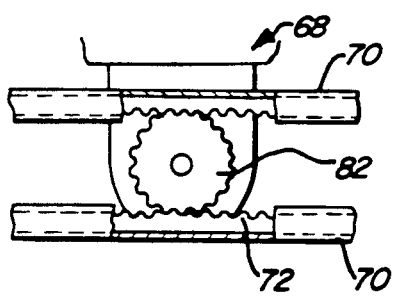
FIG. 10 is an enlarged elevation view the portion of FIG. 5 enclosed within Circle 10.

The cable 72 may be solid or tubular, generally having a raised helical or concentric band surface to provide an alternating pattern of raised and lowered surfaces on the exterior surface of the cable 72. The surfaces provide for meshing with the pinions 80 and 82 to move the cable 72, as best seen in FIG. 10. The motors 66 and 68 are reversible motors which drive the cables within the track housing channels 76. The motors 66 and 68 are rotated clockwise and counterclockwise which, in turn, move the cables 72 up and down in the channels 76 to move the panel 50 between a fully stored position and a locked horizontal use position. If two motors are used, they would be synchronized with one another. Also, the roof panel 50 actuates limit switches 135 and 139 in its storage and horizontal positions terminating power to motors 66 and 68 as will be explained herein.

Figure 8:
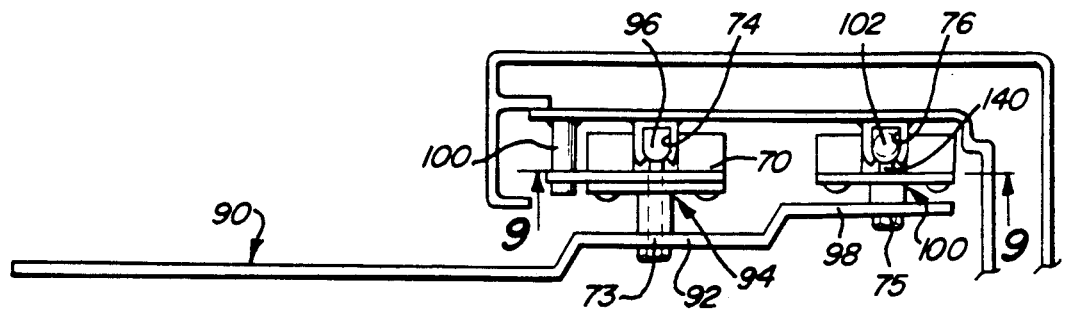
FIG. 8 is a top plan view of the roof assembly bracket, taken along the Line 8—8 of FIG. 6.
Figure 9:
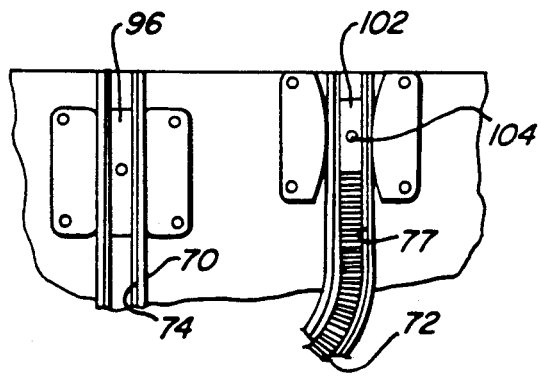
FIG. 9 is an elevation view of the track attachment, taken along line 9—9 of FIG. 8.

Brackets 90 are coupled with each side of the panel 50 and associated with the track members 62 and 64 and are synchronized to ensure simultaneous movement. The brackets 90 are elongated, having a stepped configuration in elevation, as seen in FIG. 8. Step 92 includes a follower mechanism 94 which is bolted to the bracket 90 and includes a sliding member 96 positioned within channel 74. Step 98 includes the cable securement mechanism 100 bolted thereto. The cable securement mechanism 100 includes a block 102 generally secured to the end of the cable 72 with a projecting pin 104 which is secured to the step member 98, as best seen in FIGS. 8 and 9.

Figure 4:
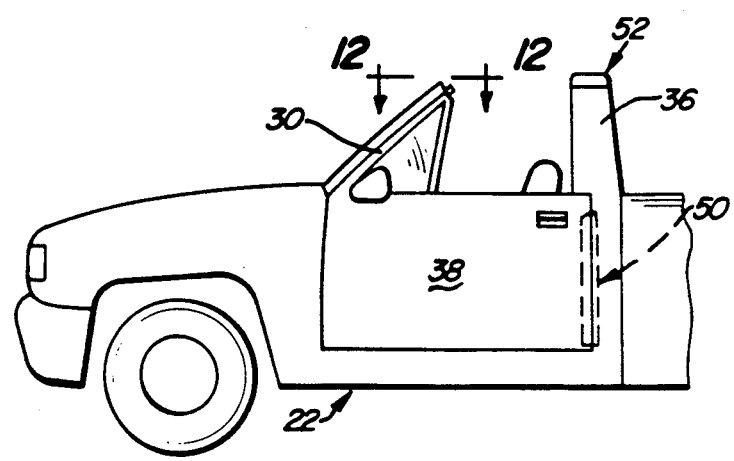
FIG. 4 is a side elevation view like that of FIG. 2 illustrating the retractable roof in a fully retracted or storage position.

The bracket 90 in its horizontal position, as seen in FIG. 6, is abutted against a stop 101. The brackets 90, upon movement of the cable 72 are pivoted about mechanism 94 by downward movement of stepped portion 98. This pivoting enables the brackets 90 and panel 50 to move from a horizontal position, as seen in FIG. 6, to a substantially vertical position, as seen in FIG. 7. Once the brackets 90 reach their vertical position, the follower mechanism 94 moves along in the channel 74 as the cable 72 moves downward in channel 76, pulling the brackets 90 and panel 50 downward to the fully stored position, as seen in FIGS. 4 and 5.

Upon raising of the roof 50, to return to its horizontal or use position, the following mechanism 94 travels in channel 74 while cable 72 travels in channel 76. Upon reaching the "Y" near the top of the housing 70, the cable 72 moves along the arcuate section 77 while the brackets 90 pivot about the follower mechanism 94. The cable 72 travels to its fully extended position as the brackets 90 pivot to their horizontal position.

The cover panel 52 includes a mechanism 110 for raising and lowering the cover panel 52 during the movement of roof panel 50 from its horizontal use position to its storage position and back again. A bar linkage 112 coupled to motor 114 raises and lowers the cover panel 52. The bar linkage 112 includes bars 116 and 118. Bar 118 has several bends and is pivotally connected with both bar 116 and cover panel 52. Bar 116 is substantially straight and planar and is coupled with the shaft 120 of the motor 114. As the motor 114 is rotated, the bar 116 is rotated, moving bar 118 upward which, in turn, raises the cover 52. As the cover panel 52 moves between its raised and lowered positions, the bar linkage 112 contacts limit switches 133 and 137 terminating power to motor 114 as will be explained herein.

Figure 12:
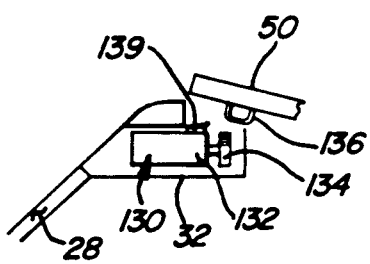
FIG. 12 is a section view illustrating the roof locking device, the section being taken along line 12—12 of FIG. 4.
Figure 11:
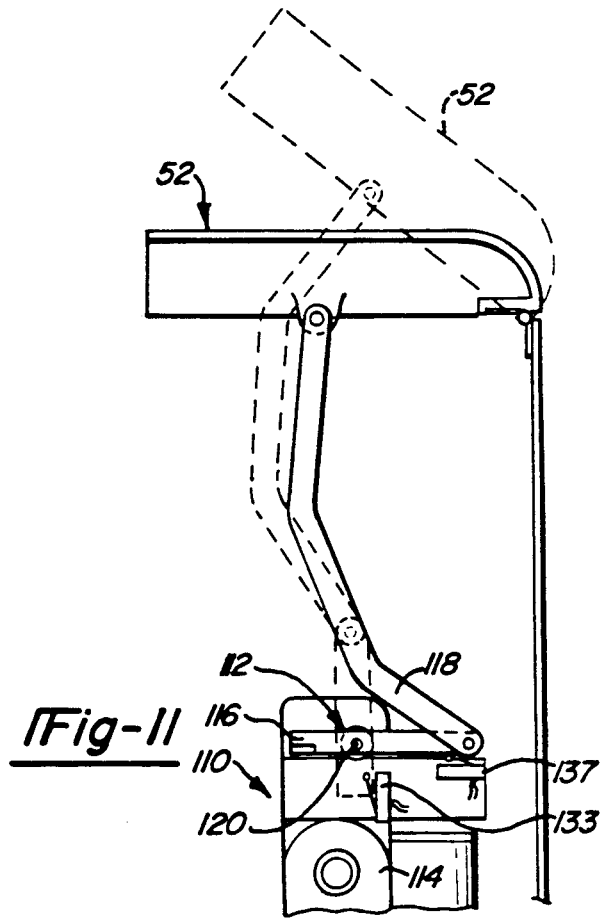
FIG. 11 is an elevation view partially in section of the cover panel lifting mechanism.

Turning to FIG. 12, a locking device 130 is illustrated for locking the roof panel 50 in its horizontal use position. The locking device 130 is positioned within the cross pillar 32 above the windshield 28. The locking device 130 includes a motor 132 and a latch 134 for latching a hook 136 located on the roof panel 50.

Figure 13:
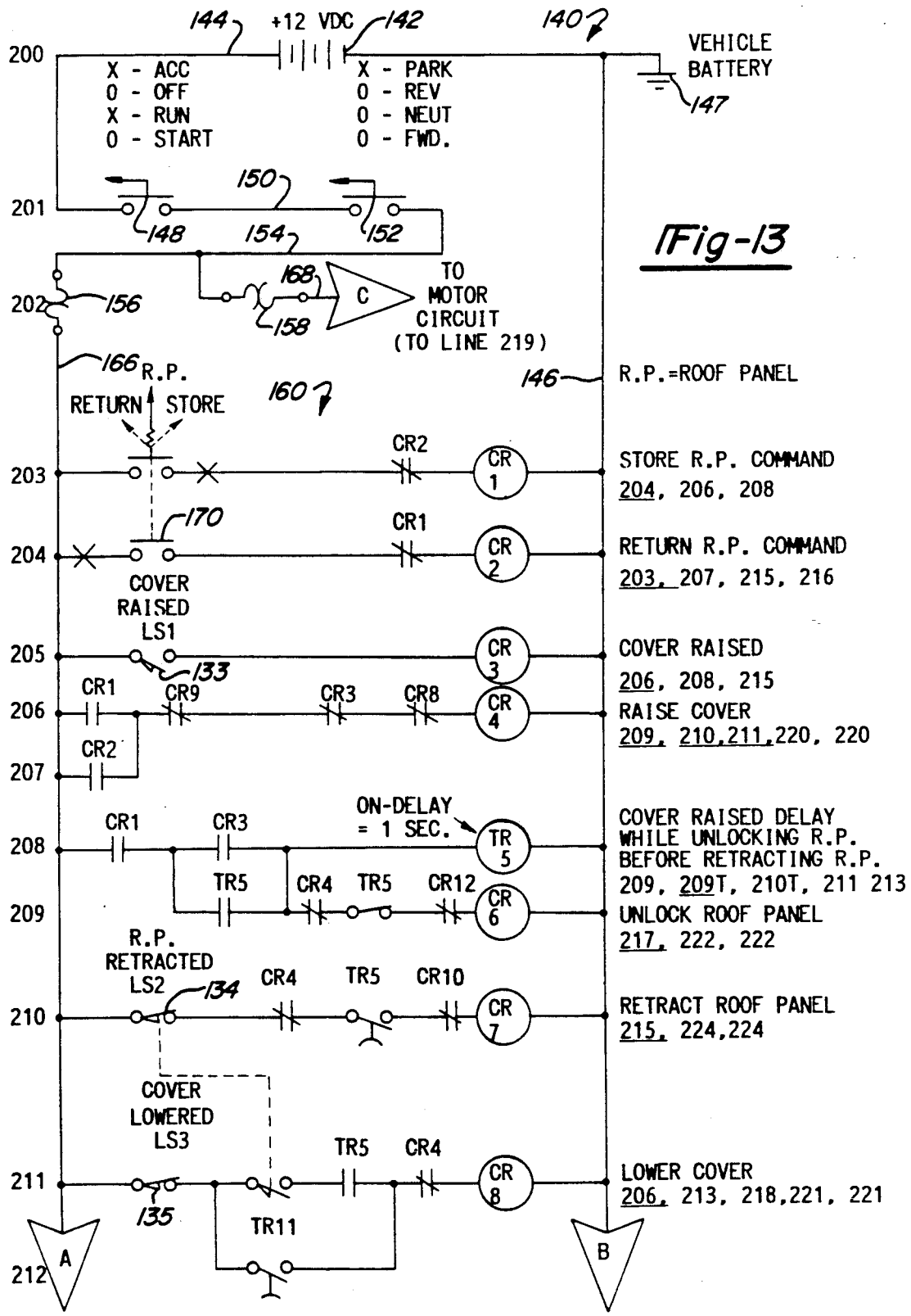
FIGS. 13 and 14 are schematic diagrams in relay ladder diagram form of an electrical control circuit which may be used to operate the automatic roof panel system of the present invention.
Figure 14:
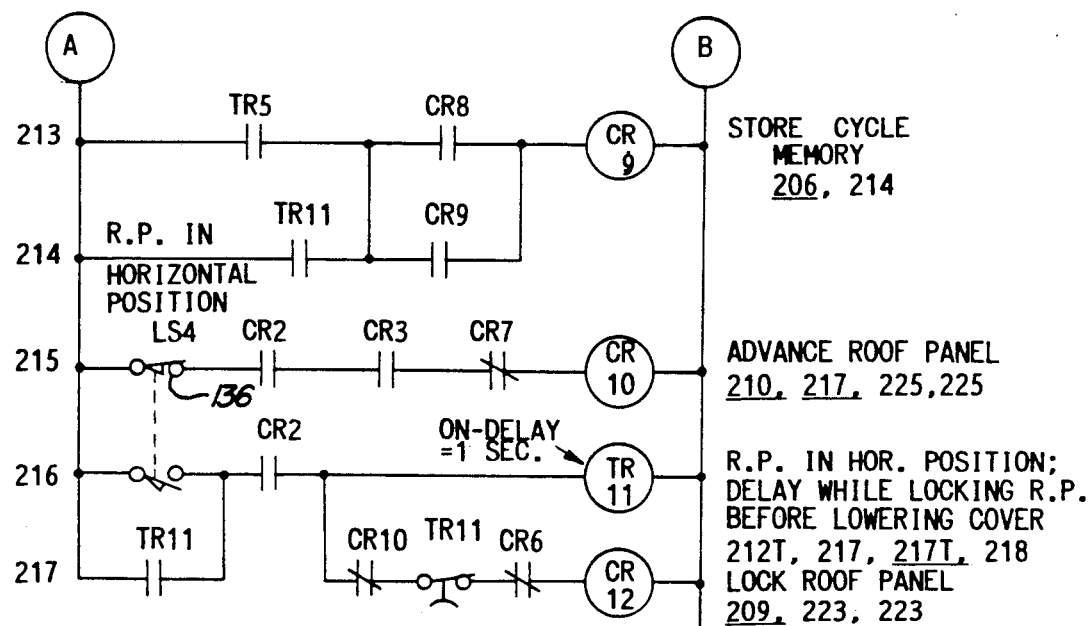
Figure 14:
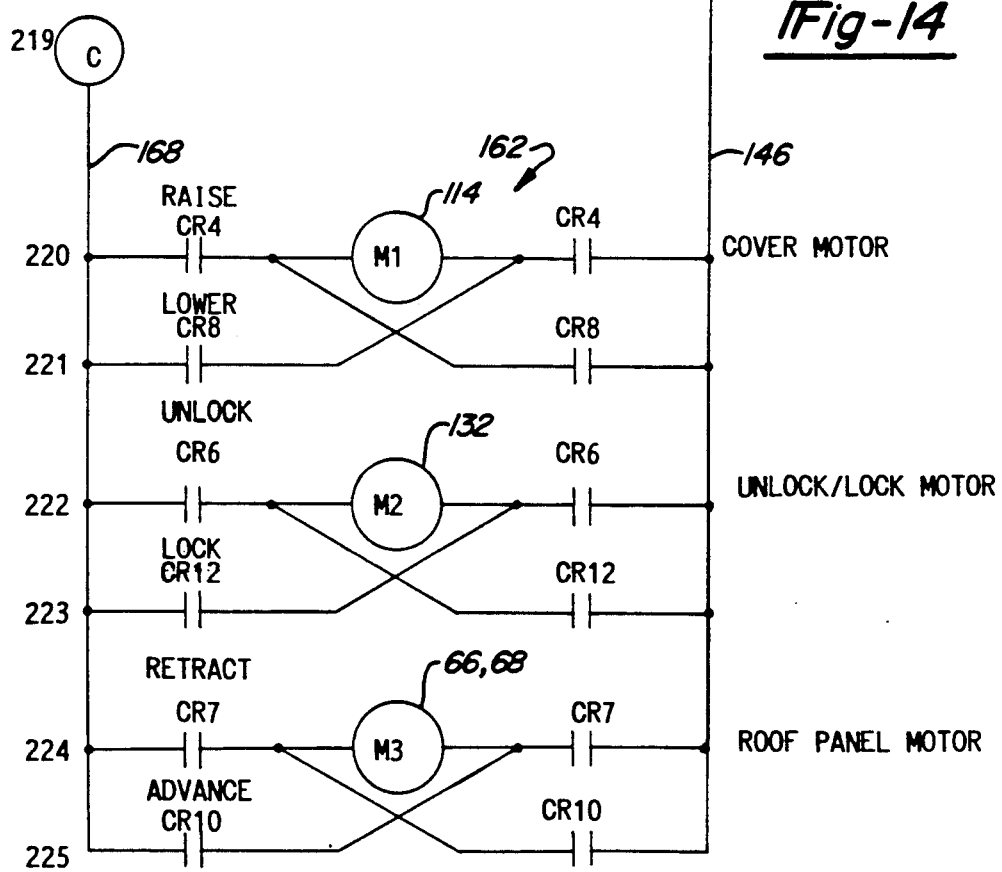

FIGS. 13 and 14 are relay ladder diagrams of one possible control circuit 140 for automatically operating both the roof panel 50 and the cover panel 52 via a simple spring-loaded rocker switch or a set of pushbuttons pressed by the driver of the vehicle. The relay ladder diagrams have line numbers on the left side of the Figures for cross-referencing purposes. The line numbers in which the contacts of relays appear have been listed generally to the right of the relays that control them, and normally closed contacts are indicated by underlining in the listings. For example, in FIG. 13, the relay CR1 is provided with three contacts, namely a normally closed contact on line 204, which is underlined, and normally open contacts on lines 206 and 208, which are not underlined. The timed contacts are indicated by the letter "T" added as a suffix to the cross-reference line numbers. For example, the normally-opened, timed-closed contact TR5 on line 210 is indicated by cross-reference numeral "210T" found in the cross-reference number listing between lines 208 and 209.

For convenience, in the electrical diagrams of FIGS. 13 and 14 the cover motor 114 is referred to as motor M1, the unlock/lock motor 132 is referred to as motor M2, and the roof panel motors 66 and 68 are referred to as motor M3. These motors are shown on lines 220, 222 and 224 respectively, and each consists of a bi-directional DC motor, whose direction of rotation is determined by the polarity applied to the leads of the motor. Similarly, the limit switches 133, 135, 137 and 139 are identified on the electrical diagram of FIGS. 13 and 14 as limit switches LS1, LS2, LS3 and LS4. Those skilled in the art will appreciate that, while these devices are called limit switch, any conventional or suitable form of switch, including magnetic proximity switches, photoelectric detectors, pressure switches or the like may be used in place of these electrical switches, as long as they are set up to detect mechanical conditions equivalent to those presently detected by the limit switches.

FIG. 13 shows the vehicle battery 142, which may be at any conventional voltage such as 12 volts, connected to two conductors 142 and 146. Conductor 146 may be grounded as indicated by ground symbol 147. Conductor 144 delivers power to a conventional four position ignition switch, which may be closed in the "accessories" and "run" positions, and open in the other two positions, namely "off" and "start." Conductor 150 is connected between switch 148 and a conventional electrical switch mounted to the vehicle transmission, which may be set up to be closed only when the transmission is in the "park" position, as indicated in FIG. 13.

When switches 148 and 152 are closed, power flows from conductor 144 to conductor 154 and on through conventional automotive fuses 156 and 158 to two branch circuits, namely relay control circuit 160 found on lines 203 through 217 and motor circuit 162 found on lines 220 through 225. Relay control circuit 160 receives its electrical power from conductors 166 and 146, while motor circuit 162 receives its electrical power from conductors 168 and 146.

To operate the circuit 160, a person within the vehicle containing the present invention must actuate three-position, spring-returned-to-center rocker switch 170 shown on lines 203 and 204. Those in the automotive art will appreciate that other actuation devices, such as one or more sets of pushbuttons at one or more locations on the vehicle may be used in place of switch 170. Rocker switch 170 (or the alternative pushbuttons) may be mounted in any convenient location on the vehicle, including on the dashboard, on the center console, on the inner liner of the passenger compartment, or even on the exterior of the vehicle if desired.

The control system 140 carries out two basic automatic sequences. The first sequence automatically moves the roof panel 50 in from its closed horizontal position to its storage position. The second automatic sequence moves the roof panel 50 from its storage position to its closed horizontal position. In both automatic sequences, the operator of the vehicle must hold switch 170 in the desired position to have the electrical circuit 140 carry out the automatic sequence of operation. If the operator removes his or her finger from the switch 170, the switch 170 automatically returns to its center position, and any motion of the cover panel 52 or roof panel 50 that is in progress stops immediately. Either sequence may be resumed if interrupted simply by re-actuating the switch 170 in the desired direction.

The automatic sequence for placing the roof panel 50 in storage begins with the operator pressing the rocker switch 170 into its "store" position, thus closing the switch contact on line 203 and energizing control relay CR1. This opens the normally-closed contacts CR1 on line 204, thus preventing relay CR2 from energizing. Also, the normally-open contacts CR1 on lines 206 and 208 close. Closing the contacts CR1 on line 206 causes relay CR4 to energize, which in turn causes the contacts CR4 on line 220 to close, thus providing electrical power to the cover motor M1 in a direction which causes the motor to raise the cover panel 52. Once the cover panel has been raised completely, the limit switch LS1 on line 205 closes, thus energizing relay CR3. Then, the normally-closed CR3 contact on line 206 opens, thus de-energizing relay CR4, which stops motor M1.

Next, the closure of the normally-open CR3 contact on line 208 causes timer relay TR5 to energize, and the instantaneous normally-open contact TR5 on line 209 seals around the contact CR3 on line 208. Also, the relay CR6 on line 209 is energized, which starts the unlock/lock motor M2 on line 222 running in its unlock direction. When the on-delay period of timer relay TR5 is over, the normally-closed, timed-open contact TR5 on line 209 opens, which de-energizes relay CR6 and turns off the motor M2. Simultaneously, relay CR7 on line 210 is energized, which energizes roof panel motor M3 to run in the direction required to retract the roof panel 50.

The operation of motor M3 causes the roof panel 50 to retract into its stored position in pocket 51, which actuates limit switch LS2. This opens the normally-closed contact of switch LS2 on line 210, thus de-energizing relay CR7, which removes power from motor M3 on line 224. Also, the normally-open contact of switch LS2 on line 211 closes, thus energizing control relay CR8, whose normally-open contacts on line 221 close, thus energizing the cover motor M1 to run in a direction which causes the cover panel 52 to be lowered. When the cover panel 52 is in its completely lowered position, switch LS3 is actuated, thus opening the normally-closed contact of the switch LS3 on line 211, which de-energizes relay CR8, and thereby stops the cover motor M1 from running. This completes the automatic cycle for lowering the roof panel into its storage position.

Even if the operator of the vehicle continues to hold the switch 170 in its "store" position, thus keeping relay CR1 energized, nothing further will happen, due to the memory circuit found on lines 213 and 214. In this circuit, when the normally-open contact CR8 on line 213 closes, relay CR9 is energized, and the normally-open seal contact CR9 on line 214 bypasses contact CR8 on line 213. Relay CR9 remains energized until the operator releases the switch 170. The normally-closed contact CR9 on line 206 thus remains open, which prevents the control relay CR4 from energizing, which stops the cover panel 52 from being raised again.

The second automatic sequence carried out by control circuit 140 is for raising the roof panel from storage into its horizontal position. This sequence begins with the closure of the second contact of switch 170 on line 204, caused by the vehicle driver pressing switch 170 into its "return" position. This causes control relay CR2 to energize. When relay CR2 is on, the normally-open contacts CR2 on lines 207, 215 and 216 are closed. The circuit path on line 207 is therefore completed, thus energizing relay CR4, which starts motor M1 on line 220. When the cover panel 52 is raised fully, limit switch LS1 on line 205 actuates, thus energizing relay CR3, which closes the normally-open contact CR3 on line 215, thus energizing relay CR10. This causes the normally-open contacts CR10 on line 225 to close, thus energizing motor M3 on line 224 to run in a rotational direction which causes the roof panel 50 to advance from its storage towards its horizontal position. When the roof panel 50 is in its fully closed horizontal position, limit switch LS4 is actuated, thus opening the normally-closed contact LS4 on line 215, which de-energizes relay CR10 so as to stop motor M3. Also, the normally-open contact LS4 on line 216 closes, thus energizing the coil of timer relay TR11. Simultaneously, control relay CR12 is energized, which locks the roof panel 50 by closing the contacts CR12 on line 223, which energizes motor M2 so that it rotates in its lock direction. After the one-second delay of timer TR11 is over, the normally-closed, timed-open contact TR11 on line 217 opens, thus de-energizing relay CR12 which stops motor M2. At the same time, the normally-open, timed-closed contact TR11 on line 212 closes, thus energizing relay CR8, which closes the normally-open contacts CR8 on line 221 and thereby energizes motor M1 to run in the direction which lowers the cover panel 52. When the cover panel is fully lowered, limit switch LS3 on line 211 is actuated, which de-energizes relay CR8 and motor M1.

Even if the vehicle operator keeps the switch 170 in its "return" position, so that relay CR2 remains energized, nothing further will happen, due to the memory circuit on lines 216 and 217. This memory circuit functions by remembering the energization of the coil of relay CR8 by energizing relay CR13 and keeping relay CR13 energized until the operator releases switch 170. Thus, the normally-closed contact CR13 on line 207 remains open, thus preventing relay CR4 from energizing after relay CR8 is de-energized by the opening of the contact LS3 on line 211.

The control relays CR1 through CR12 may be of any conventional or suitable type, including the well-known 12-volt DC miniaturized variety made by many companies, including Potter & Brumfield Company of Princeton, Ind. Solid-state timing modules are available for such relays, with either fixed or adjustable time delays, as desired. Such modules may be used for the time-delay contacts of timing relays TR5 and TR11. The time delay intervals of timers TR5 and TR11 may be made shorter or longer than one second, as long as they are long enough to allow the roof panel 50 to be unlocked or locked respectively as needed.

While a relay circuit 140 has been described for operating the motorized roof and cover panel system of the present invention, those skilled in the automotive art will readily appreciate that a dedicated solid-state electronic circuit which performs the same functions may also be designed and built to perform the logic and timing functions of relay circuit 160 shown on lines 203 through 217. Similarly, a digital microcontroller including a microprocessor and a suitable number of input and outputs may be used to implement the logic and timing functions of circuit 160 instead of electromechanical relays or discrete solid-state electronic circuits. Further, those skilled in the art will appreciate that the logic and timing of a control circuit to implement the present invention may be varied to considerable degree as long as the basic sequence of mechanical movements required to operate the roof panel 50 and cover panel 52 are carried out. Also, the unlock/lock motor M2 may be replaced, if desired by a suitable solenoid-operated lock assembly of the type in wide use for power door lock actuators on automobiles.

While the above detailed description provides a preferred embodiment of the present invention, it should be understood that the present invention is susceptible to modification, variation and alteration without deviating from the scope and true meaning of the subjoined claims.

What is claimed is:

1. A power rigid retractable roof assembly for a pickup comprising:
    a retractable substantially planar roof panel movable from a first substantially horizontal working position to a second substantially vertical storage position;
    track means having movable means for providing movement of said roof panel between said first and said second positions, said track means coupled with said roof panel; and
    motor means for moving said movable means, said motor means coupled with said movable means for automatically moving said roof between said first and second positions in response to an operator signal.

2. The power rigid retractable roof assembly according to claim 1 wherein said track means includes a pair of tracks, each track having a stationary housing and a movable cable within said housing.

3. The power rigid retractable roof assembly according to claim 2 wherein said track housing includes a follower channel adapted to couple with a follower from said roof panel.

4. The power rigid retractable roof assembly according to claim 2 wherein said cable includes alternating raised ridges and recessed grooves for coupling with said motor means.

5. The power rigid retractable roof assembly according to claim 1 wherein a bracket is coupled with said roof panel and said track means for providing a connection between the two.

6. The power rigid retractable roof assembly according to claim 1 wherein said motor means includes a pair of motors driving said track means.

7. The power rigid retractable roof assembly according to claim 1 further comprising means for opening and closing a storage compartment for said rigid roof panel, said means for opening and closing responsive to said operator signal.

8. A power rigid retractable roof assembly for a pickup truck having a cab with a roof comprising:
    a first panel adapted to be coupled with the pickup truck, said first panel including means for moving said first panel between a first position wherein said first panel is substantially horizontal forming a portion of the pickup truck roof to a second position wherein said first panel is raised enabling access into the cab of the pickup truck;
    a second rigid retractable substantially planar roof panel movable from a first position substantially horizontal and continuous with said first panel forming the roof of the pickup truck to a second position substantially vertical and stored in the cab of the pickup truck wherein upon storage said first panel returns to its first position;
    a track having a housing and cable within said housing, said cable coupled with said second panel for providing movement of said second panel between said first and second positions; and
    one or more motors driving said cable in said housing, said one or more motors being actuated by an operator providing automatic movement of said first and second panels between their first and second positions.

9. The power rigid retractable roof assembly according to claim 8 wherein said means for moving said first panel includes a bar linkage coupled with a motor which is adapted to be positioned within the cab, said motor rotating to move said bar linkage which, in turn, moves said first panel between said first and second positions.

10. The power rigid retractable roof assembly according to claim 8 wherein a bracket is coupled with said second panel and with said cable for moving said second panel between said first and second positions.

11. The power rigid retractable roof assembly according to claim 10 wherein said track includes a follower receiver to receive a follower on said bracket for engaging movement on said track.

12. The power rigid retractable roof assembly according to claim 8 wherein two reversible motors are utilized to drive said track cable.

13. The power rigid retractable roof assembly according to claim 8 wherein said track includes two track members, each member adapted to be positioned on a side of the cab opposing one another.

14. The power rigid retractable roof assembly according to claim 8 further comprising safety means for ensuring said first panel moves to its raised position prior to movement of said second panel from its horizontal position to its vertical storage position and said first panel moves its horizontal position upon said second panel reaching its stored position.

15. A pickup truck with a power rigid retractable roof assembly comprising:
 a pickup truck having a cab defining a passenger compartment, said cab having a roof including;
 a first panel pivotal between a first substantially horizontal position and a second raised position;
 motor means for driving a bar linkage, said bar linkage coupled with said first panel for moving said first panel between its first and second positions;
 a second rigid retractable roof panel moving between a first substantially horizontal position to a second substantially vertical storage position within said passenger compartment of said cab;
 a pair of track members positioned on opposing sides of said cab, said track members including a movable cable coupled with said second panel for moving said second panel between said first and second positions;
 motor means for driving said track cables for providing movement to said cables; and
 switch means positioned in said passenger compartment which upon activation energizes said first panel motor to move said first panel from its horizontal position to its raised position, energizes said motor means to drive said cables to move said second panel from its first horizontal position to its second storage position and moving said first panel to its first horizontal position, said switch means upon actuation returns said second panel from its storage position to its first horizontal position with appropriate movement of said first panel to its raised position then to its horizontal position.

16. The pickup truck rigid retractable roof assembly according to claim 15 including a control system ensuring said first panel is in its raised position prior to movement of said second panel.

17. The pickup truck rigid retractable roof assembly according to claim 16, said control system ensuring said first panel is in its horizontal position when said second panel is in its horizontal position and said first panel is in its horizontal position when said second panel is in its storage position.

* * * * *